US008882543B2

(12) United States Patent
Pabst et al.

(10) Patent No.: US 8,882,543 B2
(45) Date of Patent: Nov. 11, 2014

(54) ELECTROMAGNETIC SHIELDING DEVICE

(75) Inventors: Thomas Bernhard Pabst, Nurnberg (DE); Michael Gunreben, Schwanstetten (DE)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 115 days.

(21) Appl. No.: 13/640,065

(22) PCT Filed: Apr. 5, 2011

(86) PCT No.: PCT/EP2011/055241
§ 371 (c)(1),
(2), (4) Date: Dec. 6, 2012

(87) PCT Pub. No.: WO2011/124562
PCT Pub. Date: Oct. 13, 2011

(65) Prior Publication Data
US 2013/0084741 A1    Apr. 4, 2013

(30) Foreign Application Priority Data

Apr. 9, 2010 (WO) .................. PCT/IB2010/001277

(51) Int. Cl.
| | |
|---|---|
| *H01R 13/648* | (2006.01) |
| *H01R 13/658* | (2011.01) |
| *H01R 13/6581* | (2011.01) |
| *H01R 9/05* | (2006.01) |
| *H01R 43/20* | (2006.01) |
| *H02G 15/068* | (2006.01) |
| *H01R 13/6584* | (2011.01) |
| *H01R 4/48* | (2006.01) |
| *H01R 4/64* | (2006.01) |

(52) U.S. Cl.
CPC ...... *H01R 13/6584* (2013.01); *H01R 13/65802* (2013.01); *H01R 4/48* (2013.01); *H01R 4/643* (2013.01); *H01R 13/6581* (2013.01); *H01R 9/0527* (2013.01); *H01R 43/20* (2013.01); *H01R 4/646* (2013.01); *H01R 2201/26* (2013.01); *H02G 15/068* (2013.01)
USPC ..................... 439/607.41; 439/578

(58) Field of Classification Search
CPC . H01R 2103/00; H01R 9/0527; H01R 9/0521
USPC .......... 439/578, 580, 583–585, 607.41–607.5
See application file for complete search history.

(56) References Cited

U.S. PATENT DOCUMENTS

| | | | |
|---|---|---|---|
| 1,699,690 A * | 1/1929 | Dake | 285/382.7 |
| 4,273,405 A * | 6/1981 | Law | 439/462 |
| 4,547,623 A | 10/1985 | Van Brunt et al. | 174/35 R |

(Continued)

FOREIGN PATENT DOCUMENTS

| | | |
|---|---|---|
| DE | 2 263 060 | 7/1974 |
| DE | 24 05 885 | 8/1975 |

(Continued)

*Primary Examiner* — Ross Gushi
(74) *Attorney, Agent, or Firm* — Robert J. Myers

(57) ABSTRACT

The present invention relates to an electromagnetic shielding device for electromagnetic shielding of a power transmitting arrangement adapted to house an electromagnetically shielded conducting element. The electromagnetic shielding device has essentially the form of a sleeve and further includes a weakened portion, which is adapted to be contracted for establishing an electrical connection between the device and the shielding of the conducting element.

18 Claims, 4 Drawing Sheets

(56) References Cited

U.S. PATENT DOCUMENTS

| | | | |
|---|---|---|---|
| 4,739,126 A * | 4/1988 | Gutter et al. | 174/78 |
| 5,237,129 A | 8/1993 | Obara | 174/65 SS |
| 5,362,251 A * | 11/1994 | Bielak | 439/394 |
| 5,691,505 A * | 11/1997 | Norris | 174/51 |
| 6,296,519 B1 * | 10/2001 | Hashizawa et al. | 439/607.42 |
| 6,379,183 B1 * | 4/2002 | Ayres et al. | 439/578 |
| 6,464,538 B2 * | 10/2002 | Miyazaki et al. | 439/607.44 |
| 6,910,919 B1 | 6/2005 | Hung | 439/578 |
| 7,097,499 B1 * | 8/2006 | Purdy | 439/578 |
| 7,156,696 B1 * | 1/2007 | Montena | 439/584 |
| 7,300,309 B2 * | 11/2007 | Montena | 439/578 |
| 7,329,139 B2 * | 2/2008 | Benham | 439/352 |
| 7,722,379 B2 * | 5/2010 | Yang et al. | 439/352 |
| 7,736,194 B1 * | 6/2010 | Chang | 439/675 |
| 7,857,651 B2 * | 12/2010 | Chen | 439/352 |
| 7,857,661 B1 * | 12/2010 | Islam | 439/584 |
| 7,887,365 B1 * | 2/2011 | Orner et al. | 439/585 |
| 7,934,955 B1 * | 5/2011 | Hsia | 439/578 |
| 7,938,680 B1 * | 5/2011 | Hsieh | 439/578 |
| 8,157,594 B2 * | 4/2012 | Gilliam | 439/607.41 |
| 8,162,672 B2 * | 4/2012 | Huang | 439/63 |
| 8,187,036 B2 * | 5/2012 | Fujiwara et al. | 439/607.47 |
| 2002/0119699 A1 * | 8/2002 | Leve | 439/578 |
| 2005/0181667 A1 * | 8/2005 | Kao | 439/578 |
| 2008/0020637 A1 * | 1/2008 | Montena | 439/583 |
| 2008/0113559 A1 | 5/2008 | Hamai et al. | 439/610 |
| 2009/0305560 A1 * | 12/2009 | Chen | 439/584 |
| 2013/0084741 A1 * | 4/2013 | Pabst et al. | 439/607.17 |

FOREIGN PATENT DOCUMENTS

| | | |
|---|---|---|
| DE | 84 24 169 | 11/1984 |
| EP | 2 109 201 A2 | 10/2009 |
| JP | 11-262151 | 9/1999 |

* cited by examiner

ELECTROMAGNETIC SHIELDING DEVICE

1. FIELD OF THE INVENTION

The present invention relates to an electromagnetic shielding device for the continuous shielding of a conducting element, as e.g. a power cable.

2. TECHNICAL BACKGROUND

In many fields of applications, electrical cables and connections need to be electromagnetically shielded. In particular, in the newly growing field of hybrid or electrical vehicles, high power requirements translate into electrical circuits transporting large electrical currents and holding high voltages. Due to the electrical powers involved, shielding of the connectors and cables is an essential need to avoid possible interferences induced by electromagnetic energy. It is of importance to electrically connect the electromagnetic shielding of for example a power cable to the electromagnetic shielding of a housing to establish a shielding continuity. It is also of importance to electrically connect the electromagnetic shielding of a power connector to the electromagnetic shielding of another power connector to establish a shielding continuity. Due to the large demand for electrical components, e.g. in the field of automotive applications, such components have to be efficiently and inexpensively manufactured; however, they still have to fulfill high quality standards.

An example of a typical prior art shielding connection is given in the U.S. Pat. No. 4,547,623. Here, the shielding of a cable is electrically connected to a metallic housing to achieve a shielding continuity in a connector arrangement. To establish the connection, the cable insulation is partially removed and an assembly of different metal rings is arranged around the stripped portion of the cable in electrical contact with the cable shielding.

This ring assembly is in electrical contact with the inner surface of the conductive housing, thereby providing shielding continuity over the connector. In order to provide a more flexible solution, U.S. Pat. No. 5,237,129 proposes to use contact elements in form of torus-shaped spring elements to establish electrical contact between the shielding of a cable and the shielding of a connector housing in which the cable is mounted. These spring elements are positioned inside of a metallic housing at a stripped portion of the cable in electrical contact with the cable shielding. Upon assembly the springs are compressed in axial direction such that they expand in the radial direction thereby pressing against the cable shielding on one side and the inner wall of the metallic housing on the other side. Thus an electric connection between the cable shielding and the metallic housing is established.

The development of such connection elements culminated in sophisticated spring elements as e.g. presented in the very recent publication EP 2 109 201 A2 (published in October 2009). This document discloses a new kind of spring element which can be mounted inside of a metallic housing establishing an electrical connection to the shielding of a cable within a stripped portion of the cable. This new spring element is constructed in a very sophisticated way offering a large range of possible diameters for the cable as well as a large range of possible inner diameters of the housing.

The above described parts are examples of common solutions providing an electrical connection between the shielding of a power cable to an outer connecting element as e.g. the shielding of a connector housing. The solution proposed in document U.S. Pat. No. 4,547,623 constitutes a complicated assembly consisting of many parts. The connecting parts are inflexible metallic rings which have to be fabricated within small tolerances and are therefore only applicable within a special designated assembly. Documents U.S. Pat. No. 5,237,129 and EP 2 109 2010 A2 propose to establish the required connection by using spring elements which are more flexible. However, such elements are complicated in fabrication and expensive. For these reasons, the above described solutions are in particular not optimal for the use in mass production.

One of the aims of the present invention is to provide a new electromagnetic shielding device which minimizes or eliminates the above described problems. These and other objects which become apparent upon reading the following description are solved by an electromagnetic shielding device according to claim 1.

3. SUMMARY OF THE INVENTION

According to the invention, a new electromagnetic shielding device for shielded conducting elements, as e.g. power cables, is provided. The new electromagnetic shielding device essentially has the form of a sleeve and is adapted to receive at least a part of the conducting element. It comprises at least one weakened portion which can be inwardly contracted to establish an electrical connection between the shielding device and the shielding of the conducting element. In this way the connection means to establish an electrical connection between the electromagnetic shielding device and the shielding of the inserted conducting element is incorporated in the device itself. The inventive device thus allows omitting extra connection parts such as expensive contact springs, facilitating the manufacturing in mass production and making the device more reliable. In a preferred embodiment the electromagnetic shielding device is in particular adapted to receive and shield a high power connection assembly. In a preferred embodiment, the electromagnetic shielding device is designed for connecting directly the shield of a counter-connector.

Therefore, it is of great advantage that complicated parts can be avoided, e.g. by incorporating their function into parts which are unavoidable. The shielding device according to the invention allows minimizing the required parts which are needed to establish an electric connection between a shielding device and the electromagnetic shielding of the inserted conducting element. The shielding device can then preferably be made from a single piece of sheet of metal (not limited to sheet metal).

Such an electromagnetic shielding device allows a continuous shielding of complex assemblies. For example, when cables have to be connected to power contacts, the cables have to be stripped to allow the electrical connection (for instance by crimping). The stripped cable core and usually the power contact are not electromagnetically shielded and thus a shielding "bridge" is required. The new electromagnetic shielding device is particularly adapted to continue the shielding of power cables in when the cables are mounted in a connector assembly.

In a preferred embodiment, the weakened portion is realized in form of an essentially cylindrical ring section preferably comprising a plurality of slots which are oriented essentially parallel to the longitudinal axis of the sleeve-shaped device. The weakened portion may be realized in an inexpensive way by e.g. simply stamping or cutting a sheet metal blank before rolling the same. Furthermore, it is then possible to contract the cylindrical ring section by inwardly bulging of the wall sectors which are remaining between the slots. When the conducting element is inserted into the inventive device, the inwardly bent sectors will preferably be biased to apply a spring force to the shielding of the conducting element. Due to the spring force a flexible mechanical and therefore a reliable electrical connection between the electromagnetic shielding device and the cable shielding is established, which allows displacement of the two members which may occur e.g. during assembly without destroying the connection. Furthermore, although the slots may be shaped essentially straight, the same may preferably be shaped so that the remaining wall sectors comprises a constriction approximately in the middle section, which facilitates the bending of these wall sectors in the desired form.

In a preferred embodiment, the electromagnetic shielding device is made from a sheet of metal which is stamped and rolled into the desired essentially cylindrical shape. It is important to note that the term "cylindrical" as used herein does not necessarily refer to the mathematical meaning but rather is used to indicate the tube shape which results for example from rolling sheet metal pieces, and may e.g. also have a more or less oval cross section.

Note that in all the preferred embodiments, the electrical connection between the electromagnetic shielding device and the shielding of the conducting element may be established without the need of separate contact elements, like the contact springs used in the prior art discussed above.

To facilitate the assembly of the shielding device and the conducting element it is preferred that the electromagnetic shielding device comprises at least one edge or corner adapted to interact for example with a corresponding part of an assembly tool, so that the tool compresses the inventive device while inserting the conducting element therein, and so that the weakened portion is automatically contracted. Thus the electrical connection of the inventive device with the shielding of the conducting element is automatically established without the need for any extra steps during assembly.

Preferably, the electromagnetic shielding device provides a shielding of at least 40 dB, preferably at least 55 dB, most preferably at least 70 dB in the range of 10 kHz to 50 MHz and at least 40 dB, preferably 55 dB, most preferably 65 dB in the range of 5 kHz to 500 MHz.

Preferably, the electromagnetic shielding device is adapted to receive a conducting element which is given essentially in form of a power cable which comprises an essentially coaxial shielding portion. Preferably said power cable comprises a stripped portion so that in assembled condition the weakened portion of the inventive device is contracted establishing an electrical connection with the surface of the cable shielding within this stripped portion. Thus, in a preferred embodiment the new electromagnetic shielding device is particularly suited to continue an electromagnetic cable shielding e.g. across a connector assembly, where the cable insulation and shielding are removed.

The electromagnetic shielding device preferably is adapted to be installed within a power connector arrangement which preferably can conduct currents of more than 10 A, preferably more than 25 A, most preferably more than 50 A and/or to transmit a power of more than 1.6 kW, preferably more than 10 kW, more preferably more than 20 kW, yet more preferably more than 30 kW, even more preferably more than 40 kW and most preferred more than 50 kW.

4. DESCRIPTION OF THE PREFERRED EMBODIMENT

In the following, the invention is described exemplarily with reference to the enclosed figures in which.

Figure 1:
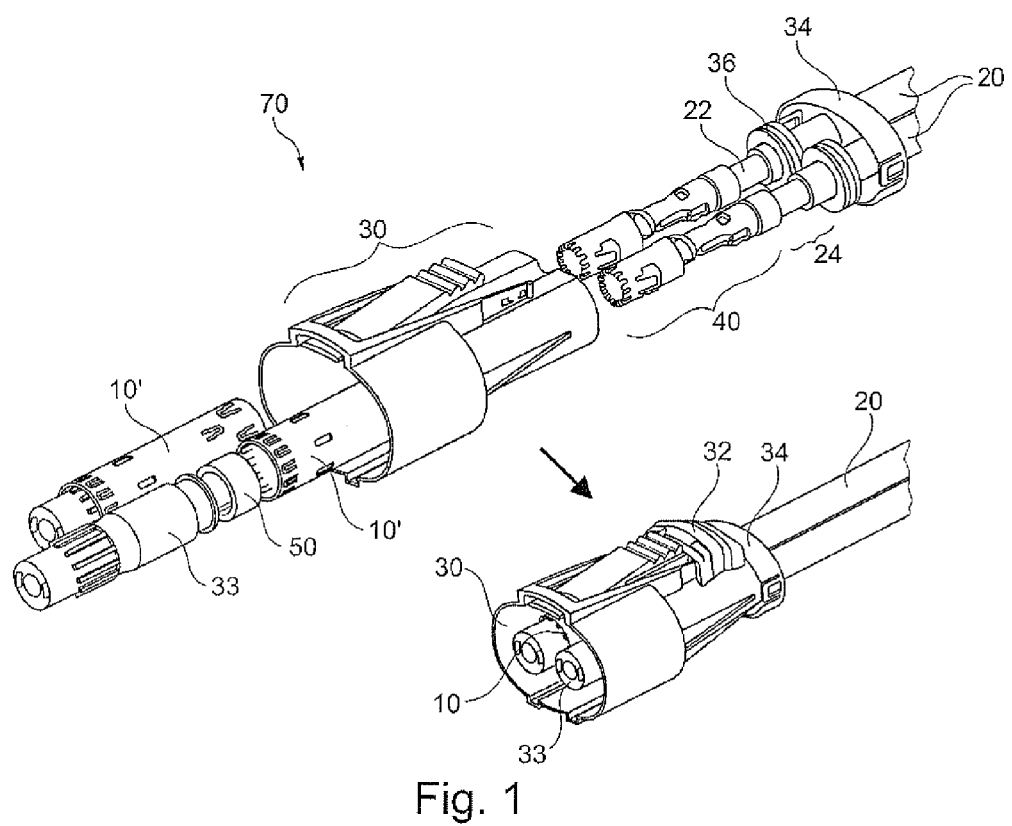
FIG. 1 is a schematic illustration showing an assembly comprising a prior art connection element 50.

FIG. 1 is a schematic illustration showing a newly developed prototype connector assembly 70 comprising a prior art contact spring member 50, which in the figure is drawn only schematically. The shown connector assembly 70 is an example of a power transmitting arrangement chosen for instructive purposes. In general, the inventive electromagnetic shielding device is adapted to be used in different power transmitting arrangements ranging from simple cable connections to more complicated, multiple cable connectors or similar arrangements. Exemplarily, the assembly shown comprises two power cables 20, each cable comprising a stripped portion 24 where the cable shielding 22 is exposed and visible. Each cable further comprises a female contact terminal 40 and is equipped with a sealing ring 36. The figure shows further two insulation tubes 33 and two shielding devices 10'.

The lower part of the figure illustrates the mounted connector assembly 70. As one can see, a connector housing 30 accommodates the insulation tubes 33, which enclose the female contact terminals 40. The insulation tubes 33 are partially inserted into the shielding devices 10'. As one may derive from FIG. 1 the insulation tube 33 and the prior art contact member 50 are mounted adjacent to each other inside the shielding device 10', the shielding device partially covering the insulation tube. The insulation tube 33 covers the female contact terminal 40 and a part of the cable 20, while the prior art contact member 50 is mounted at the stripped portion 24 in contact with the cable shielding 22, thereby establishing an electrical contact between the cable shielding 22 and the shielding device 10'. Hereby, the electromagnetic cable shielding 22 is a continued shielding with the female contact terminal 40. In connection with a corresponding counter-connector, the device 10' is in contact with a corresponding shielding element of the counter-connector, forming a continuous shielding between the two connectors. A cover 34 closes the connector housing from the cable side and by pressing the sealing rings 36 against a corresponding sealing surface inside the connector housing 30, it protects the assembly 70 against moisture. The connector assembly further comprises a CPA member 32, the function of which is however not relevant to the present invention.

Figure 2:
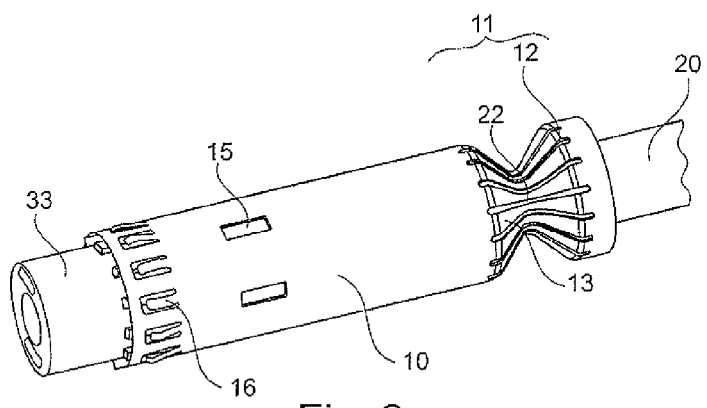
FIG. 2 is a perspective view of a preferred embodiment of the electromagnetic shielding device according to the invention.

FIG. 2 shows a shielding device 10 which is a further development of the shielding device 10' comprising the invented way of establishing an electrical connection between said shielding device 10 and the cable shielding 22 without the need of any prior art contact members 50. As one can see, the shielding device 10 comprises a weakened portion 11 realized in form of a weakened ring section consisting of slots 12 which are cut or stamped out of the shielding device 10 essentially parallel to the longitudinal axis of the shielding device 10. Between the slots 12 wall sectors 13 remain. In the mounted condition shown in FIGS. 2 and 3, said weakened portion 11 is contracted onto the cable shielding 22 within a stripped portion of the cable 20, thereby establishing an electrical connection between the shielding device 10 and the cable shielding 22. The contraction of the weakened portion 11 is realized by inwardly bending the sectors 13 essentially in a V-shaped form. The essentially V-shaped form of the bending assures that the sectors 13 apply a spring force to the surface of the cable shielding 22. Hereby, a flexible mechanical and therefore a safe electrical connection between the electromagnetic shielding device 10 and the cable shielding 22 is provided which allows displacements of the two members to a certain extend which can occur during assembly of the connector or during its operation due to e.g. temperature differences. Preferably, in all the inventive embodiments the weakened portion 11 comprises at least 6, preferably at least 12, most preferably 24 slots. The shielding device 10 is fixed to an insulation tube 33 by means of locking clearances 15 and is further provided with contact tongues 16. From the figure it can be seen that the slots 12 are shaped so that the remaining wall sectors 13 comprises a constriction close to the middle of the weakened portion 11 to facilitate the bending of said sectors in the desired form.

Figure 3:
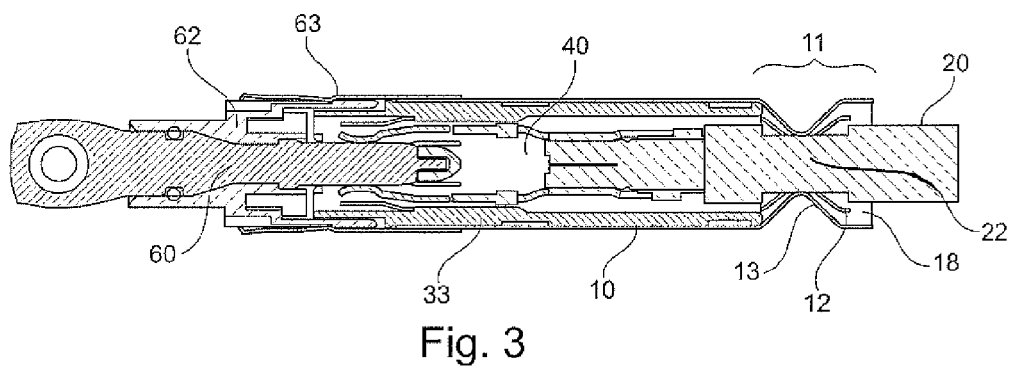
FIG. 3 is a cross-sectional view showing an exemplary application of the device of FIG. 2 in a connection housing.

FIG. 3 is a cross-sectional view showing an exemplary application of the inventive electromagnetic shielding device 10. The inventive device 10 is mounted on an insulation tube 33 and is in electrical contact via portion 11 with cable shielding 22, similar to the arrangement of FIG. 1 but without the prior art contact member 50. Further, a housing part 62 of a corresponding counter-connector holds a contact pin 60 which is inserted in and is in electrical contact with a female terminal 40. Reference number 63 indicates another shielding element 63 assigned to the counter-connector. Shielding element 63 and shielding device 10 are in contact with each other thereby providing a shielding continuity over the whole assembly. The figure illustrates the V-shaped bending of the sectors 13 of the weakened portion 11. The weakened portion 11 comprises a compression edge 18 which allows compressing the electromagnetic shielding device 10, thus contracting the weakened portion 11, for example with a corresponding part of an assembly tool while inserting the cable 20 during the assembly procedure, as will be explained in the following with reference to FIGS. 4A and 4B.

Figure 4A:
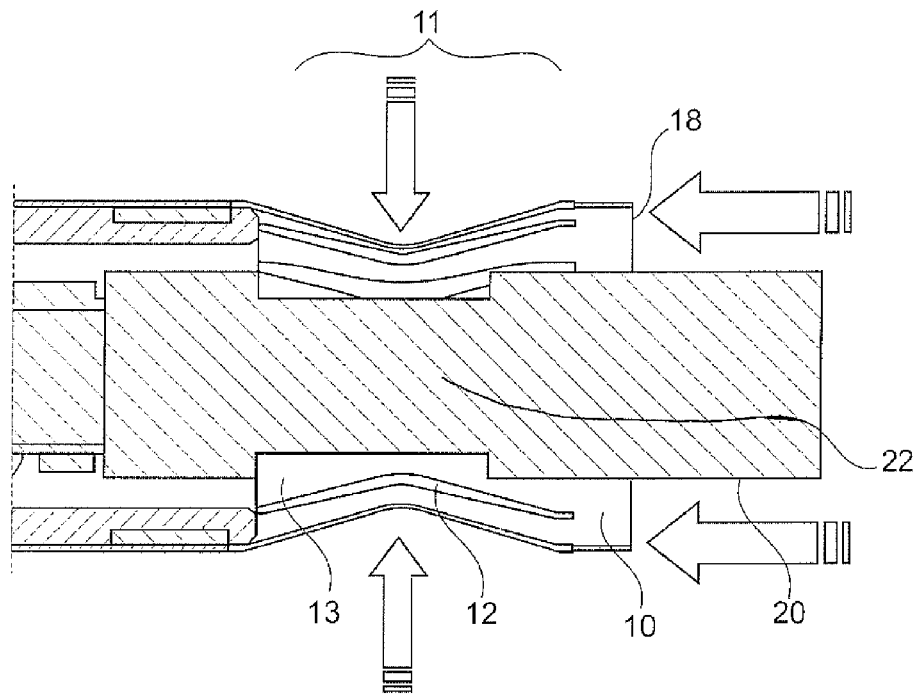
FIGS. 4A and 4B illustrate a preferred way of establishing an electrical connection between the inventive device and a conducting element.
Figure 4B:
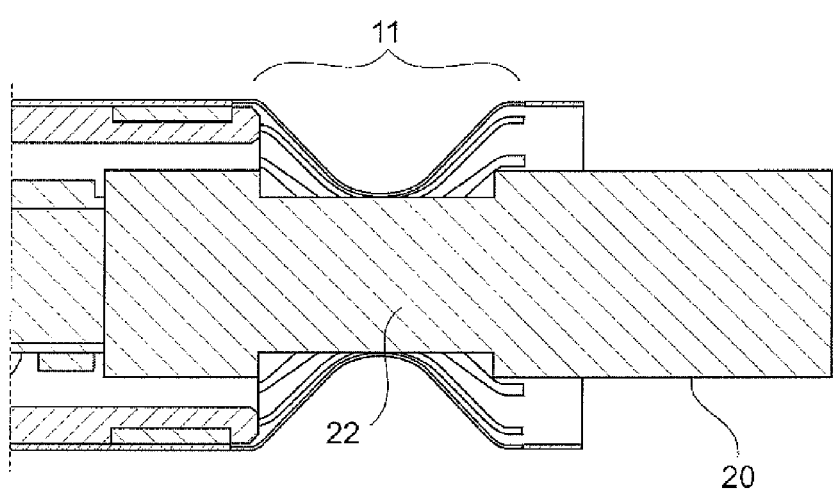

A preferred method for electrically connecting the shielding device 10 to the cable shielding 22 is illustrated in FIGS. 4A and 4B. Due to the shape of the inventive shielding device 10 it is possible to establish an electrical connection between the device 10 and the shielding 22 of an inserted cable 20 by applying a pressure to the compression edge 18 in the direction indicated by the two arrows on the right hand side of the upper part of the figure. If the device 10 is fixed, e.g. in a holder, applying such a pressure will result in a deformation of the sectors 13 of the weakened portion 11, bending these sectors either inwards or outwards. To ensure that the sectors bend inwards it is possible to arrange a support tube (not shown in the figure) around the weakened portion 11 during the process of compression. The lower part of the figure shows the weakened portion 11 in contact with the cable shielding 22 after the compression is completed. The sectors 13 are bend inwards essentially in a V-shaped form applying a spring force to the surface of the cable shielding 22. It is important to note, that the above described process of establishing the electrical connection between the inventive device 10 and a cable shielding 22 can be incorporated into an unavoidable production step such as the step of inserting the cable into the device thus reducing the need of any extra production steps.

Figure 5A:
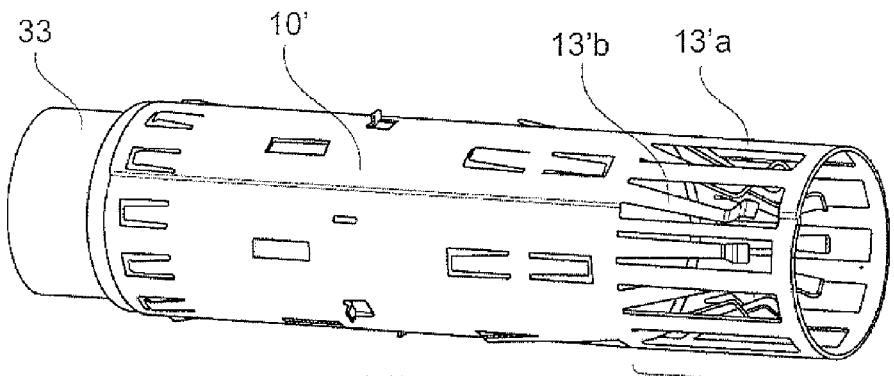
FIGS. 5A and 5B show a second embodiment of the electromagnetic shielding device according to the invention.
Figure 5B:
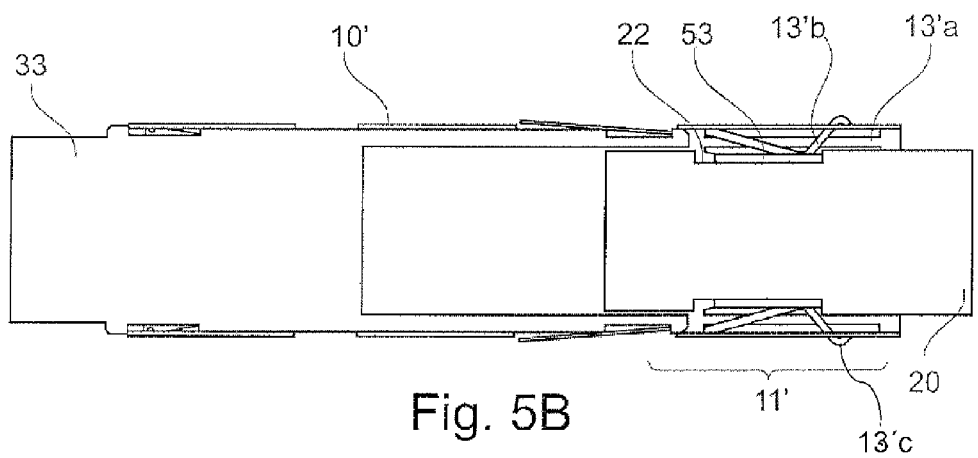

FIGS. 5A and 5B show an alternative embodiment of the electromagnetic shielding device 10' in accordance with the invention. As one can see, the main difference with respect to the above described embodiment is the form of the weakened portion 11': in the alternative embodiment the actual contacting with the cable shielding is realized by inwardly bending wall sectors 13'b, and the weakened portion 11' further comprises remaining wall sectors 13'a in form of non-bend wall portions. Thereby, the construction is provided with enhanced rigidity. The inwardly bent wall sectors 13'b are bent essentially in V-shaped form so that they apply a spring force to the surface of an inserted member as it can be seen in FIG. 5B: The electromagnetic shielding device 10' is shown assembled with an insulation tube 33 and a cable 20. In this embodiment, an optional contact ring 53 is additionally mounted on the cable shielding 22. Such a contact ring is much less expensive as e.g. the contact springs of the prior art mentioned above and does not increase the overall production costs significantly. Similar to the case described above, the wall sectors 13'b press against the contact ring 53 by means of a spring force, thereby establishing an electrical connection between the electromagnetic shielding device 10' and the cable shielding 22. In FIG. 5B one can see that the free ends 13'c of the wall section 13'b protrude to some extend from the outer surface of the sleeve. Thereby it is possible to apply an additional pressure, e.g. by a bushing, a cover or similar which acts onto the free ends 13'c.

Figure 6:
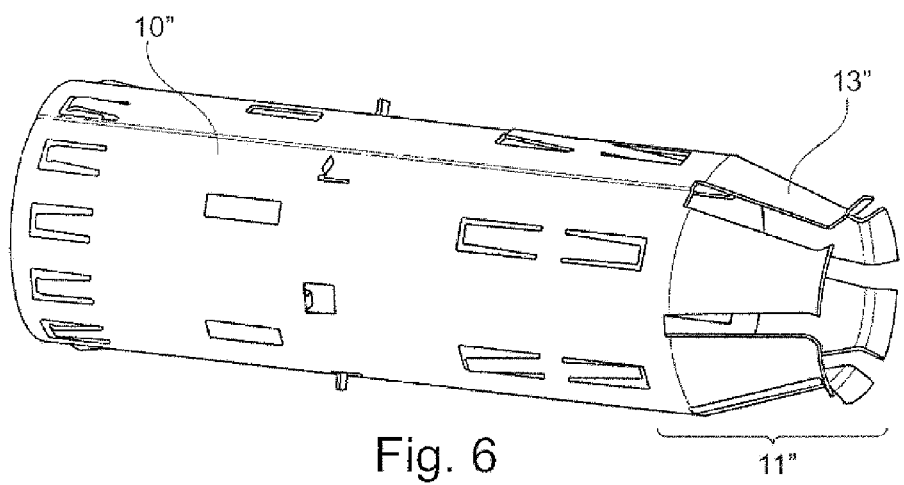
FIG. 6 is a perspective view of a third embodiment of the electromagnetic shielding device according to the invention.

FIG. 6 shows another alternative embodiment of an electromagnetic shielding device 10". As one can see, in this embodiment the weakened portion 11" consists in inwardly bend wall sectors 13" which are shaped in a similar form as the sectors 13"b, however, the sectors 13"a are missing. Further, the wall sectors 13" are wider as compared to the sectors 13"b but similarly bent inwards in essentially V-shaped form.

The invention claimed is:

1. An electromagnetic shielding device for electromagnetic shielding of a power transmitting arrangement configured to house an electromagnetically shielded conducting element, wherein the shielding device has essentially the form of a sleeve, said electromagnetic shielding device comprising:
a shielding sleeve extending axially along longitudinal axis and having a weakened portion, which is configured to be contracted axially and to be contracted radically inwardly toward the longitudinal axis, from an initial non-connected state to a final connected state in which the weakened portion applies a spring force to said shielded conducting element for establishing an electrical connection and a shielding continuity between the shielding sleeve and the shielded conducting element, wherein the shielding sleeve provides a continuous electromagnetic shielding across the shielded conducting element, where insulation and shielding of the conducting element is removed.

2. The electromagnetic shielding device according to claim 1, wherein the weakened portion of the shielding sleeve is characterized as a weakened ring section, wherein a wall of this weakened ring section defines a plurality of slots oriented parallel to the longitudinal axis of the shielding sleeve and defining wall sectors between the slots which, in cross section, are bent in a V-shaped form having an inwardly oriented point, the contraction of the weakened ring section being realized by inwardly bulging of said wall sectors in between the slots.

3. The electromagnetic shielding device according to claim 2, wherein the wall sectors between the slots of the weakened ring section are adapted to be bent inwards, such that in assembled condition the sectors will apply a spring force to the shielding of the conducting element.

4. The electromagnetic shielding device according to claim 2, wherein the sectors between the slots of the weakened ring section are adapted to be bent inwards forming essentially a V-shape.

5. The electromagnetic shielding device according to claim 2, wherein at least one of the slots is shaped so that at least one of the adjacent sectors comprises at least one weakened portion or a constriction to facilitate bending thereof.

6. The electromagnetic shielding device according to claim 2, wherein the weakened portion comprises a reduced diameter compared to the main body of the shielding sleeve.

7. The electromagnetic shielding device according to claim 2, wherein the shielding sleeve comprises at least one axial end compression edge which by axially applying a pressure to this compression edge is configured to compress the shielding sleeve, thus inwardly bending said wall sectors between the slots of the weakened ring section and thus contracting the weakened portion.

8. The electromagnetic shielding device according to claim 7, wherein the compression edge is the axial end edge of an axial end section of the shielding sleeve which does not define any slots.

9. The electromagnetic shielding device according to claim 2, wherein a radial distance, separating each V-shaped wall sector from the longitudinal axis is reduced when the weakened portion of the shielding sleeve is contracted axially and radically inwardly toward the longitudinal axis, from the initial non-connected state to the final connected state.

10. The electromagnetic shielding device according to claim 1, allowing a shielding of at least 40 dB in the range of 10 kHz-5 MHz.

11. The electromagnetic shielding device according to claim 1, adapted to house a cable which comprises at least one portion for power or signal transmission and a preferably coaxially arranged portion for electromagnetic shielding of said cable.

12. The electromagnetic shielding device according to claim 1, adapted to be installed in a power connector arrangement, the power connector arrangement being able to transmit a power of more than 50 kW.

13. The electromagnetic shielding device according to claim 1, wherein the electrical connection between the electromagnetic shielding device and the electromagnetic shielding of the conducting element is established without separate contact spring elements.

14. The electromagnetic shielding device according to claim 1, made from sheet of metal which is stamped and rolled into an essentially cylindrical shape.

15. An assembly, comprising:
  at least one electromagnetic shielding device according to claim 1;
  at least one electromagnetically shielded conductor for power or signal transmission; and
  a connector housing, wherein the at least one shielded conductor is at least partially mounted inside the at least one shielding device; the shielding device and the shielded conductor being mounted inside the connector housing.

16. The assembly according to claim 15, further comprising a female contact terminal, the female contact terminal at least partly mounted inside the electromagnetic shielding device.

17. The assembly according to claim 15, further comprising a housing part of a counter-connector having another shielding element, wherein the other shielding element and electromagnetic shielding device are in contact with each other thereby providing a shielding continuity over the whole assembly.

18. A method for manufacturing an electromagnetic shielding device comprising the following steps:
  a) providing an electromagnetic shielding device in accordance with claim 1;
  b) inserting the electromagnetically shielded conductor;
  c) contracting the weakened portion to establish an electrical connection between the electromagnetic shielding device and the shielding of the conductor.

* * * * *